M. A. KENDALL.
PULLEY.
APPLICATION FILED NOV. 28, 1917.
1,292,799.
Patented Jan. 28, 1919.
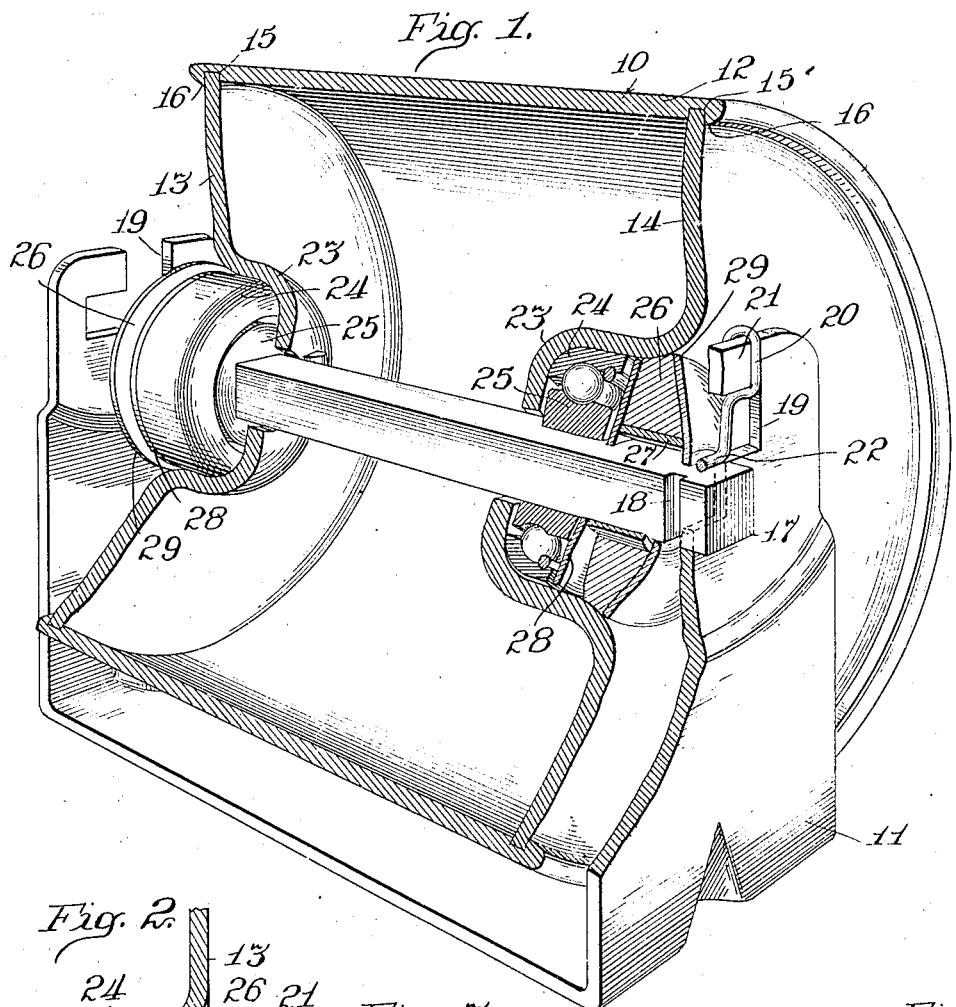
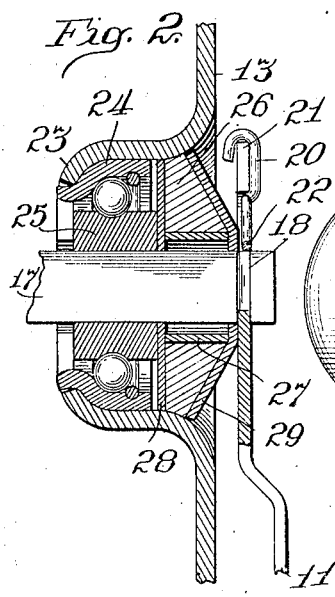
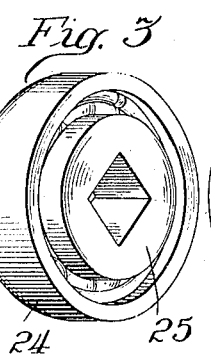
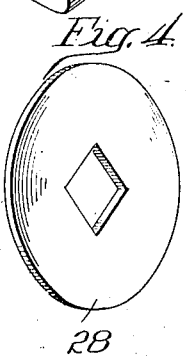
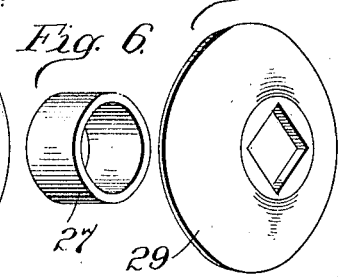
Inventor
Myron A. Kendall
By Gillson & Gillson
Attorneys.

UNITED STATES PATENT OFFICE.

MYRON A. KENDALL, OF AURORA, ILLINOIS, ASSIGNOR TO STEPHENS-ADAMSON MANUFACTURING COMPANY, OF AURORA, ILLINOIS, A CORPORATION OF ILLINOIS.

PULLEY.

1,292,799.

Specification of Letters Patent.

Patented Jan. 28, 1919.

Application filed November 28, 1917. Serial No. 204,403.

*To all whom it may concern:*

Be it known that I, MYRON A. KENDALL, a citizen of the United States, and resident of Aurora, county of Kane, and State of Illinois, have invented certain new and useful Improvements in Pulleys, of which the following is a specification, and which are illustrated in the accompanying drawings forming a part thereof.

The invention relates to pulleys and more particularly to those intended for use as supports for belt conveyers. Inasmuch as belt conveyer installations frequently require the use of a very large number of pulleys and these are subjected to long service under exacting conditions while a free running of the pulleys at all times is of the utmost importance in preventing undue wear upon the belt, the provision of improved means for supporting the pulley which will not readily wear out and require replacement is greatly to be desired.

An object of the present invention is therefore to produce a pulley which is provided with an anti-friction bearing at each end, which bearing is fully protected from the dust and dirt usually present during the use of conveyer belts and from the escape of lubricant.

In the accompanying drawings,—

Figure 1 is a perspective view of a pulley embodying the features of improvement provided by the invention, partly broken away to show the construction of the bearings, Fig. 2 is a vertical axial section through one of the bearings, Fig. 3 is a perspective view of one of the pairs of ball races, and Figs. 4, 5 and 6 are perspective views, each showing a separate part of the dirt excluding means.

The pulleys, as 10, provided by the invention are more particularly intended for use in individual U-shaped holders, as 11. In this case each pulley and its holder constitute an independent unit adapted to enter into the construction of a belt conveyer support of any form, the selected form of the support being produced by mounting the necessary number of the units upon a suitable frame.

The rim 12 of the pulley is desirably made without joints, as by cutting a wrought metal tube into lengths which are slightly longer than the finished pulley. The pulley 10 also comprises end plates 13 and 14. These pulley ends are conveniently stamped from flat metal plates and each end may be formed with a plain circular periphery.

To provide a permanent and rigid connection of the end plates 13, 14 with the rim 12, the ends of the tube from which the rim is formed are rabbeted upon the inside, forming an outwardly facing shoulder 15 and a projecting flange 16. After the end plates 13 and 14 have been placed in position, one against each of the shoulders 15, the flanges 16 are folded inwardly over the edge of the corresponding plate. The end plates are thereby firmly held in place and the rim 12 of the pulley is provided with a smooth rounded edge at each end.

The pulley is preferably arranged to rotate about a stationary axle 17 and the ends of this axle are carried by the upstanding ends of the U-shaped holder 11. As shown, the axle 17 is of rectangular cross section. For connecting the ends of the axle with the holder, the axle is grooved on its opposite vertical faces, as at 18, into which grooves extend the edges of a cross-shaped slot 19 in the holder 11. Under these circumstances, a wire clip 20 may be employed for preventing displacement of the axle 17 from the holder, particularly during transportation. This wire clip is formed to inclose and slide upon the part 21 of the holder 11 above the horizontal portion of the cross shaped slot 19, the lower portion 22 of the clip entering the said horizontal portion of the slot above the axle.

As belt conveyers are very largely employed for conveying crushed rock and other hard material it is very important that the fine dust and grit of such material be excluded as far as possible from the bearing surfaces or otherwise the bearings would require frequent lubrication and renewal. Protection of the bearings from dust is accomplished in some measure by locating each bearing wholly within the plane of the corresponding end plate, 13, 14. For this purpose the end plates 13 and 14 are depressed centrally to form relatively deep sockets 23, to the inner ends of which sockets are attached cups 24, each cup forming the outer ball race of a ball bearing unit generally designated 30. The inner race of each ball bearing 30 comprises a hub 25, non-rotatably mounted on the axle 17.

As each ball bearing 30 is located at the inner end of the corresponding socket 23, sufficient room is thereby provided in front of the ball bearing, for a felt or other fibrous or resilient ring 26 whose function is to keep out dust and dirt and at the same time to restrict the escape of oil or other lubricant employed in the ball bearing. The felt ring 26 is mounted on a collar 27 surrounding the axle 17 and is supported laterally by means of washers 28 and 29. These washers preferably have rectangular apertures adapted to engage the rectangular axle 17 whereby the washers are held against rotation and in turn the felt ring 26 is held against rotation by frictional engagement with the washers.

Preferably the outer washer 29 is dished, its outer edge being within the plane of the corresponding end plate 13, 14, while its central portion extends somewhat beyond the plane of the said end plate and contacts with the adjacent part of the holder 11. With this construction, the parts are held in position while at the same time any grit or dirt is shed by the inclined outer surface of the washer 29. Should a small amount of grit enter between the wall of the socket 23 and the outer edge of the washer 29 it would be caught by the felt ring 26. The dished form of the washer 29 also provides a convenient means for compressing the outer edge of the felt ring 26, thereby insuring contact of the periphery of the felt ring with the side wall of the socket 23.

I claim as my invention:—

1. The combination with a chambered belt conveyer pulley comprising an imperforate rim and a pair of centrally apertured but otherwise imperforate end plates, each end plate being inwardly depressed about its aperture to form a relatively deep outwardly facing central socket, of a non-rotating axle extending through the apertures of both end plates, an antifriction bearing element seated in the socket of each end plate and engaging the axle, each of the said bearing elements being of less length than the corresponding socket, a non-rotating ring of soft dust-excluding and lubricant-retaining material seated in and substantially filling the socket of each end plate in front of the corresponding bearing element and means for compressing said ring, the compressing means acting with greater force adjacent the periphery of the ring than at its inner edge.

2. The combination with a chambered belt conveyer pulley comprising an imperforate rim and a pair of centrally apertured but otherwise imperforate end plates, each end plate being inwardly depressed about its aperture to form a relatively deep outwardly facing central socket, of a non-rotating axle of rectangular cross-section extending through the apertures of both end plates, an antifriction bearing element seated in the socket of each end plate and engaging the axle, each of the said bearing elements being of less length than the corresponding socket, a collar surrounding the shaft in front of each bearing element, a ring of soft dust excluding and lubricant retaining material surrounding said collar and substantially filling the socket of each end plate in front of the bearing element, and an outwardly bulging washer applied to the axle in front of each collar and ring, the rim of each washer fitting within the socket of the corresponding end plate and the central portion of each washer being located in front of the plane of the body portion of the corresponding pulley end plate whereby dirt is shed by the inclined outer surface of the washer and the periphery of said ring is compressed into close contact with said socket by the inclined inner surface of the washer.

3. The combination with a chambered belt conveyer pulley comprising an imperforate rim and a pair of centrally apertured but otherwise imperforate end plates, each end plate being inwardly depressed about its aperture to form a relatively deep outwardly facing central socket, of a non-rotating axle extending through the apertures of both end plates, an antifriction bearing element seated in the socket of each end plate and engaging the axle, each of the said bearing elements being of less length than the corresponding socket, a ring of soft dust-excluding and lubricant-retaining material seated in and substantially filling the socket of each end plate in front of the corresponding bearing element and an outwardly bulging stiff washer applied to the axle in front of each of the said rings, the said bulging washers fitting within the socket of the corresponding end plates and the central portion of each bulging washer being located in front of the plane of the body portion of the corresponding pulley end plate, whereby dirt is shed by the inclined outer surface of the washer and the periphery of said ring is compressed into close contact with said socket by the inclined inner surface of the washer.

MYRON A. KENDALL.